United States Patent
Tajima et al.

[19]

[11] Patent Number: 6,113,826

[45] Date of Patent: Sep. 5, 2000

[54] MANUFACTURING METHOD FOR U-BOLTS

[75] Inventors: Isao Tajima, Nara; Yuji Kometani, Kyoto, both of Japan

[73] Assignee: SOWA Co., Ltd, Osaka, Japan

[21] Appl. No.: 09/163,473

[22] Filed: Sep. 30, 1998

[30] Foreign Application Priority Data

Oct. 2, 1997 [JP] Japan ..................................... 9-269690

[51] Int. Cl.[7] ................. B29D 1/00; B32B 1/10
[52] U.S. Cl. .................... 264/159; 264/163; 264/296; 264/257; 264/313; 156/173; 156/193; 411/389; 411/907; 411/908
[58] Field of Search ..................... 264/159, 162, 264/313, 314, 257, 157, 324, 163, 296; 411/907, 908, 389; 156/173, 175, 193

[56] References Cited

U.S. PATENT DOCUMENTS

| | | | |
|---|---|---|---|
| 4,209,483 | 6/1980 | Batchelar ................................. | 264/159 |
| 4,623,290 | 11/1986 | Kikuzawa et al. ....................... | 411/350 |
| 5,080,547 | 1/1992 | Moghe ..................................... | 411/436 |
| 5,127,783 | 7/1992 | Moghe et al. ............................ | 411/411 |
| 5,209,888 | 5/1993 | Shimada et al. ......................... | 264/250 |
| 5,795,121 | 8/1998 | Tucker et al. ............................ | 411/442 |
| 5,876,829 | 3/1999 | Dupont et al. ........................... | 428/114 |

*Primary Examiner*—Jan H. Silbaugh
*Assistant Examiner*—Stefan Staicovici
*Attorney, Agent, or Firm*—Browdy and Neimark

[57] ABSTRACT

A manufacturing method for U-bolts comprising the steps of (a) winding a linear, tape or cloth member made of fiber reinforced plastics in which at least a part of the fiber is oriented in three-dimensional directions around a mandrel having a substantially oval or rectangular section (b) making a pipe molded article by hardening the linear, tape or cloth member wound around the mandrel, (c) cutting the hardened pipe molded article into slices transverse to a longitudinal axis of the mandrel, (d) separating the molded article cut into slices into at least two U-shaped portions, and (e) forming screw portions at tip portions of a pair of separated U-shaped portions.

5 Claims, 5 Drawing Sheets

6,113,826

MANUFACTURING METHOD FOR U-BOLTS

BACKGROUND OF THE INVENTION

1. Technical Field of the Invention

The present invention relates to a manufacturing method for U-bolts. More particularly, it relates to a manufacturing method for U-bolts made of fiber reinforced plastics (hereinafter referred to as simply "FRP") in which fiber is oriented in three dimensional directions wherein the manufacturing method for U-bolts is superior in terms of mass-productivity.

2. Prior Art

Generally, when attaching and fixing metal pipes employed as piping to wall surfaces or the like, it is often the case that U-bolts of the same material as used for the metal pipes are employed in terms of corrosion-resistivity. In recent years, piping made of resin are promoted for utilization as piping due to reasons such as being light-weighted or being superior in view of corrosion-resistivity. For example, piping used in septic tank peripheries which are embedded underground for which corrosion-resistivity is required and which are cost-consuming in terms of maintenance have been gradually changed to piping made of resin.

However, there are still being used conventional metallic U-bolts as U-bolts for fixing these piping made of resin and thus provide problems in terms of maintenance etc., since these U-bolts suffer, for instance, from corrosion.

Accordingly, there have been increasingly used U-bolts made of FRP which are light-weighted, corrosion-resistant, and which further present sufficient strength and conclusive force.

When manufacturing U-bolts made of FRP, it is required to make the direction of orientation of fiber included in the FRP to be three-dimensional (e.g. to be meshed) so that the fiber does not get finely cut by thread portions which might cause a decrease in strength of thread or damages thereof.

When manufacturing U-bolts made of FRP, the following steps had been conventionally taken: a linear or tape-like member made of FRP with fiber being oriented in three-dimensional directions is cut to a specified length, bent into U-shape and hardened by heating etc. Thereafter, threads are formed at tip portions of the hardened U-shaped portions.

Since each article was individually produced in manufacturing methods for U-bolts made of FRP, the efficiency was quite poor and inadequate for mass-production. Further, since such a method results in large irregulars in quality of manufactured U-bolts, it is also difficult to improve the reliability of the product.

The present invention has been made to solve such problems, and it is an object of the present invention to provide a manufacturing method for U-bolts wherein U-bolts are made of FRP in which fiber is oriented in three-dimensional directions and which is superior in terms of mass-productivity.

SUMMARY OF THE INVENTION

The manufacturing method for U-bolts according to a first embodiment of the invention is characterized in that it comprises the steps of:

(a) winding a linear, tape-like or cloth-like member made of fiber reinforced plastics in which at least a part of the fiber is oriented in three-dimensional directions around a mandrel having a substantially oval or rectangular section;

(b) making a pipe-like molded article by hardening the linear, tape-like or cloth-like member wound around the mandrel, (c) cutting the hardened pipe-like molded article into slices along a width direction of the mandrel, (d) separating the molded article cut into slices into at least two U-shaped portions, and (e) forming screw portions at tip portions of a pair of separated U-shaped portions.

The manufacturing method of U-bolts according to a second embodiment of the invention is characterized in that it comprises the steps of:

(a) arranging a linear, tape-like or cloth-like member made of fiber reinforced plastics in which at least a part of the fiber is oriented in three-dimensional directions to an interior of a groove formed in a mold member and having a plurality of U-shaped portions, (b) hardening the linear, tape-like or cloth-like member arranged in the groove of the mold member, and (c) separating the hardened linear, tape-like or cloth-like member into at least two U-shaped portions.

It is preferable that screw portions are formed to corresponding portions of the tip portions of the separated U-shaped portions by presswork after the linear, tape-like or cloth-like member is arranged to the groove of the mold member.

It is preferable that not less than two grooves having a plurality of U-shaped portions are formed adjacent to each other on the mold member and linear, tape-like or cloth-like members be respectively arranged to these grooves.

It is preferable that the fiber reinforced plastics include thermosetting resin.

It is preferable that the fiber reinforced plastics include ultraviolet setting resin.

It is preferable that the fiber reinforced plastics be composed of a core comprising long fibers extending in an axial direction, and at least one coating layer comprising long fibers oriented in three-dimensional directions and arranged around the core.

It is preferable that the fiber reinforced plastics be made by adhering short fibers oriented in three-dimensional directions with respect to long fibers.

According to the present invention, a linear, tape-like or cloth-like member made of FRP in which fiber is oriented in three-dimensional directions is first wound around an oval mandrel or arranged to snaking grooves having a plurality of U-shaped portions such that the single linear, tape-like or cloth-like member is deformed to obtain a plurality of U-shaped portions which are hardened by heating etc. thereafter. When the plurality of U-shaped portions are separated thereafter, it is possible to produce a huge amount of U-bolts at one time.

BRIEF DESCRIPTION OF THE DRAWINGS

FIGS. 3(a) and (b) are respectively a perspective view showing an example of a second embodiment of a linear member employed in the manufacturing method for U-bolts according to the present invention and a cross-section there through;

FIGS. 4(a) and (b) are respectively a perspective view showing an example of a second embodiment of a linear member employed in the manufacturing method for U-bolts according to the present invention and a cross-section there through;

DETAILED DESCRIPTION OF THE INVENTION

Figure 1:
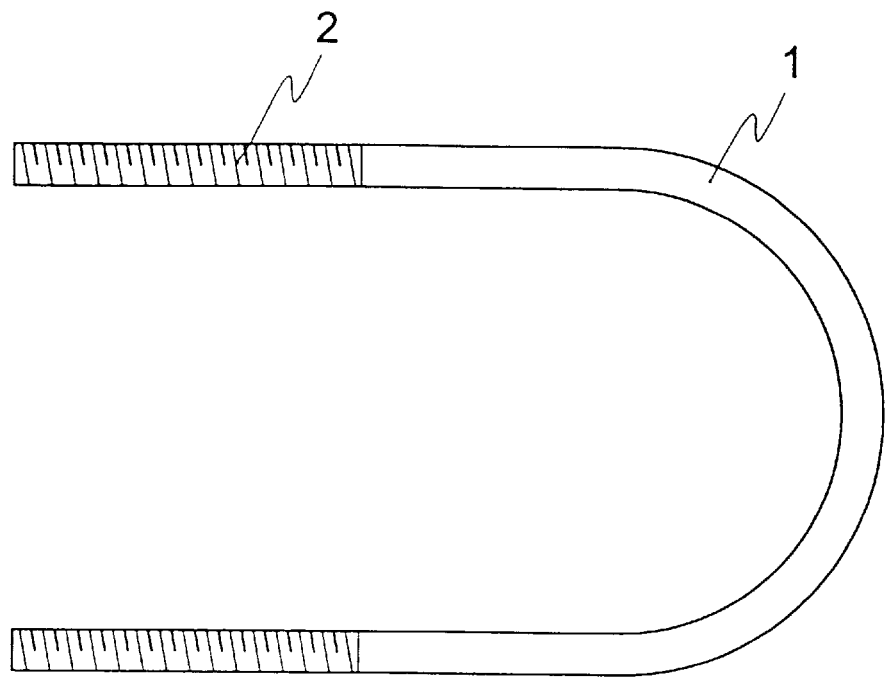
FIG. 1 is a front view showing an example of an U-bolt manufactured by a manufacturing method for U-bolts according to the present invention.
Figure 2:
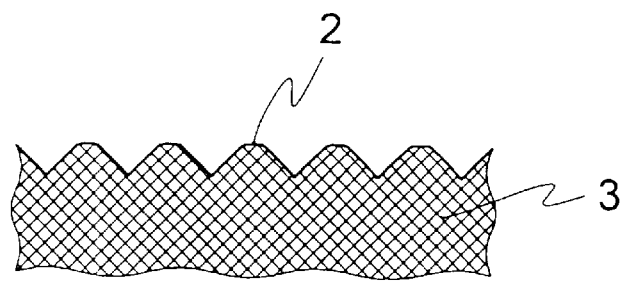
FIG. 2 is a partial, sectional view of a thread portion of the U-bolt of FIG. 1.

As shown in FIGS. 1 and 2, an U-bolt 1 manufactured by the manufacturing method of the present invention is made of FRP in which at least a part of fiber is oriented in three-dimensional directions, for example, in a meshed manner, and the fiber is impregnated with resin. Consequently, a sufficient conclusive force can be obtained since fiber 3 for reinforcement included in the FRP does not get finely cut by thread portions 2 which might cause a decrease in strength of the thread portions 2 or damages thereof.

As for fiber 3 included in the FRP, inorganic fiber such as glass, carbon or ceramic fiber can be employed, and any style might be employed as long as at least a part of the fiber is oriented in three-dimensional directions. It should be noted that organic fiber can also be used.

Figure 3A:
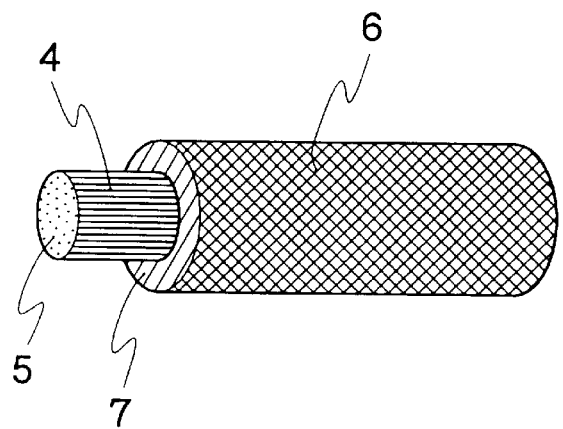
Figure 3B:
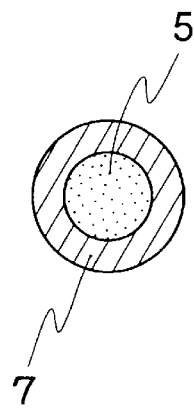

As shown, for instance, in FIGS. 3(a) and (b) and 4(a) and (b), when at least one coating layer 7 in which long fiber 6 is oriented in three-dimensional directions by being knitted in a meshed manner, is arranged around a core 5 made of long fibers 4 extending in an axial direction, the long fibers 4 extending in an axial direction can be made to be sufficiently resistant against tension and bending load, and additionally a decrease in strength or damages in thread portions formed in the coating layer 7 in which fiber is oriented in three-dimensional directions can be prevented.

Figure 4A:
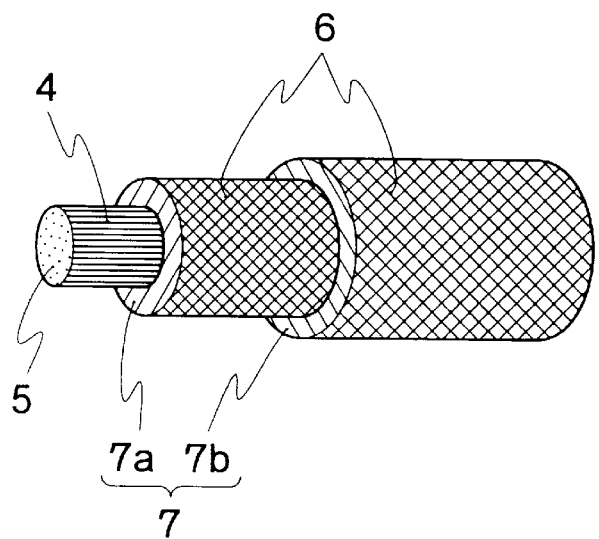
Figure 4B:
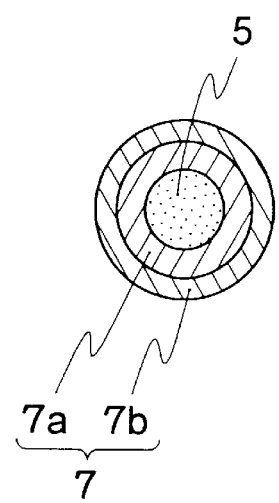

Further, as shown in FIGS. 4(a) and (b), in the case where a plurality of coating layers 7a, 7b are laminated as coating layer 7, it is made possible to form threads for bolts of large diameter which might exceeding M24.

Though not shown in the drawings, a decrease in strength or damages in thread portions can also be prevented by employing long fiber oriented in three-dimensional directions by being knitted in a string-like manner instead of arranging coating layers.

It should be noted that if short fibers are additionally adhered to be oriented in three-dimensional directions with respect to long fiber oriented in three-dimensional directions in case of employing the above discussed coating layer or in case the long fibers are knitted in a string-like manner, there can be even more effectively prevented a decrease in strength or damages of thread portions.

Resin included in the FRP might be of materials which can be deformed to form a plurality of U-shaped portions and which can be hardened by heating etc. after deforming the same, and examples of those employable materials are epoxy resin, vinyl ester resin or phenol resin.

Since U-bolts are formed into sizes that correspond to respective standards having, for instance, a circular or square shape, they are easily manufactured, when they are made of metal, by threading both ends of a round rod and bending this round rod into standard sizes. On the other hand, similar methods might be employed for manufacturing U-bolts made of FRP in case thermoplastic resin is used. However, thermoplastic resin is inferior in terms of time-varying deformation or corrosion-resistivity.

Accordingly, it is preferable to employ thermosetting resin such as epoxy resin which presents little time-varying deformation and is also superior in terms of corrosion-resistivity when it is hardened through heating after deformation so that U-shaped portions are formed.

The volumetric ratio of fiber contained in the FRP is employable to be approximately 50 to 90% with respect to the total volume of the FRP, and the higher the ratio of fiber becomes, a FRP of higher strength can be obtained. Further, as for the impregnating method of resin, while resin can be sufficiently impregnated by dipping a bundle of fiber such as string-like fiber having a three-dimensional arrangement into resin, it is also possible to utilize a vacuum impregnating device.

A manufacturing method for U-bolts is now explained by referring to FIGS. 5 to 8.

Figure 5:
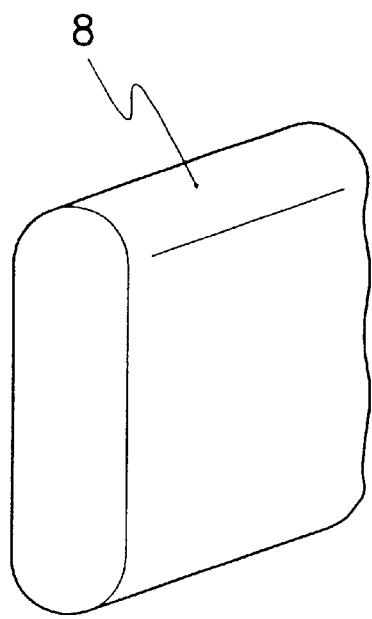
FIG. 5 is a perspective view of a mandrel used in the process of a manufacturing method for U-bolts according to the present invention.

First, as shown in FIG. 5, there is prepared a mandrel 8 made of metal such as iron or stainless steel having a substantially oval or substantially rectangular section which is obtained when open portions of the U-bolts are faced to each other.

Figure 6:
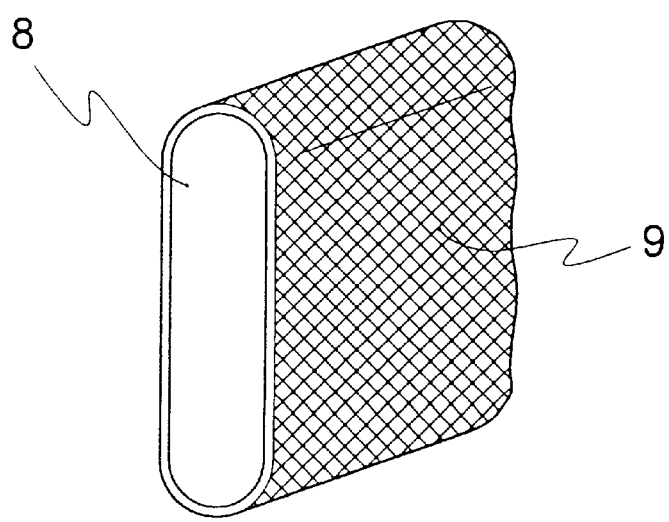
FIG. 6 is a perspective view of the mandrel of FIG. 5 with a FRP covering.

Next, as shown in FIG. 6, a FRP 9 made of inorganic long fiber which is preliminarily molded in a linear, tape-like or cloth-like manner and impregnated with thermosetting resin such as epoxy resin stated above, is wound around the surface of the mandrel 8 to approximately correspond to a desired thickness for the U-bolt (winding). It should be noted that FIG. 6 shows a condition in which the winding of the linear, tape-like or cloth-like FRP 9 has been completed.

Thereafter, the linear, tape-like or cloth-like FRP 9 wound around the mandrel 8 is hardened by heating and pressing.

Figure 7:
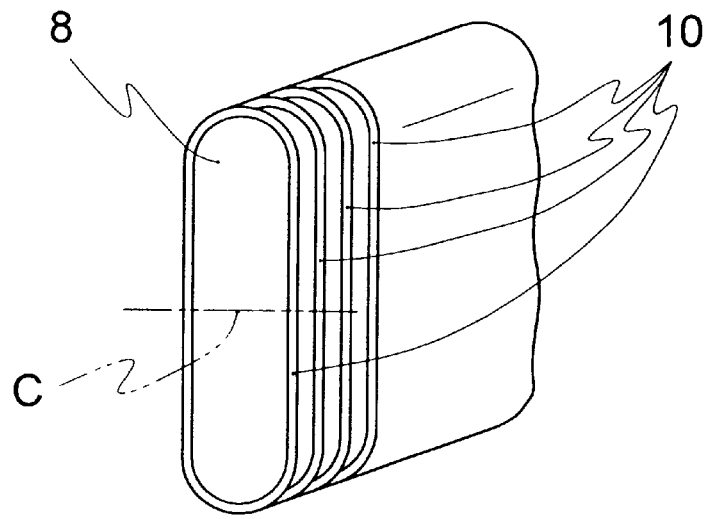
FIG. 7 is a perspective view of the covering of FIG. 6 partially sliced in accordance with the invention.

Then, when the mandrel 8 is pulled out from the FRP 9, a pipe-like FRP molded article 10 having an oval or rectangular section is completed. This FRP molded article 10 is cut into slices along a width direction of the mandrel 8, as shown in FIG. 7. It should be noted that the process of cutting into slices might alternatively be performed before the mandrel 8 is pulled out from the FRP molded article 10.

Figure 8:
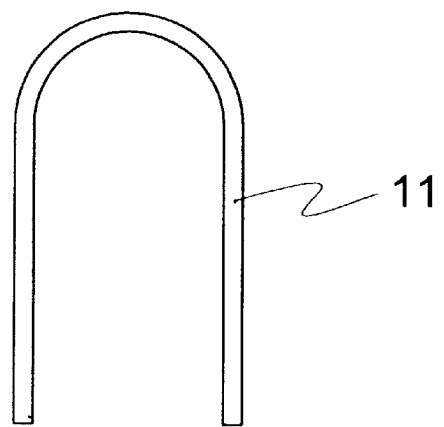
FIG. 8 is a plan view of the U-bolts in accordance with the invention.

Thereafter, the FRP molded article 10 cut into slices is further cut at center C to separate it into two U-shaped portions 11 (see FIG. 8).

Finally, when a screw portion of a predetermined length is formed at a pair of tip portions of the U-shaped portions 11 of FIG. 8, the U-bolt 1 as shown in FIG. 1 is obtained. Formation of screw portions might be performed by and with a conventionally known cutting method and device.

According to the manufacturing method of U-bolts as shown in FIGS. 5 to 8, approximately 80 to 200 U-bolts (or, particularly, U-shaped portions 11 before being threaded) made of FRP can be simultaneously manufactured per each mandrel 8, whereby this method is much superior in terms of mass-productivity.

Next, a second method of manufacturing U-bolts will be explained.

Figure 9:
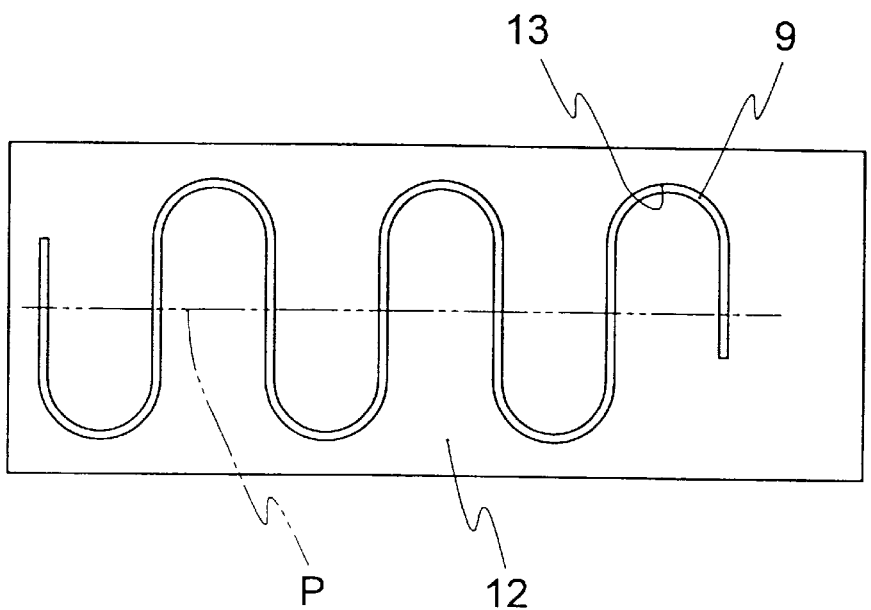
FIG. 9 is a plan view of a mold for a manufacturing method for U-bolts according to another embodiment of the invention.

As shown in FIG. 9, when manufacturing U-bolts by press-molding, FRP 9 made of inorganic long fiber which is preliminarily molded in a linear (which includes being string-like), tape-like or cloth-like manner and impregnated with thermosetting resin such as epoxy resin stated above, is arranged in an interior of a groove 13 having a plurality of U-shaped portions formed in a mold member 12 made, for instance, of metal.

Then, a die (not shown) being opposite to the mold member 12 is pressed into the mold member 12, and the FRP 9 is hardened (molded) into a shape in which a plurality of U-bolts are successive by pressing and heating.

Thereafter, the hardened FRP 9 is separated along cutting line P into at least two U-shaped portions, and when a threading process is finally performed similarly to the above discussed process, the U-bolt of FIG. 1 can be obtained.

By press-molding as in FIG. 9, U-bolts made of FRP can be mass-produced, similarly to the above-mentioned method.

It should be noted that in case thread molds are preliminarily formed at predetermined locations in the mold member 12 and die (not shown), thread portions might be formed at portions corresponding to respective tip portions of the U-shaped portions simultaneously with the molding by simply arranging the FRP 9 to the groove 13 of the mold member 12 and pressing thereafter. Consequently, the processing work for the threads can be omitted.

Figure 10:
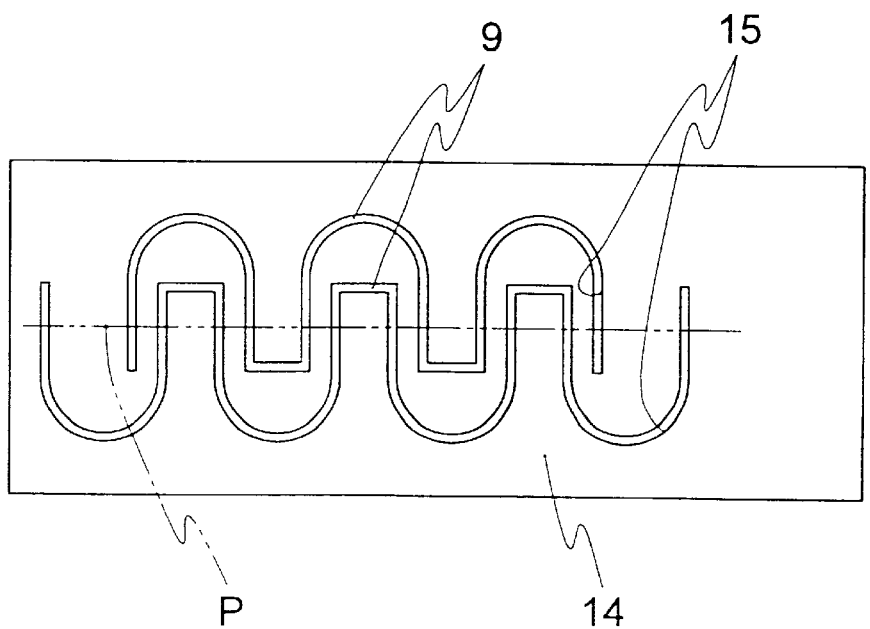
FIG. 10 is a plan view of a mold for a manufacturing method for U-bolts according to another embodiment of the invention.

Further, as shown in FIG. 10, in case not less than two grooves 15 having a plurality of U-shaped portions are formed in mold member 14 made, for instance, of metal, and linear or tape-like FRP 9 are respectively arranged into these grooves 15, more U-bolts can be mass-produced than compared to the mold member 12 of FIG. 9 though their areas are equal.

Further, when manufacturing U-bolts by the above-mentioned press-molding, the quality of U-bolts can be further stabilized when further performing postcuring of unhardened resin after pressing.

According to the present invention, U-bolts made of FRP in which fiber is oriented in three-dimensional directions can be mass produced in by far huge amounts and yet at low cost than compared to the conventional art.

Moreover, since the quality of manufactured U-bolts can be maintained to be almost uniform, the reliability of the product is largely improved.

What is claimed is:

1. A manufacturing method for U-bolts comprising the steps of:
   (a) winding a linear, tape or cloth member made of fiber reinforced plastics in which at least a part of the fiber is oriented in three-dimensional directions around a mandrel having a substantially oval or rectangular section,
   (b) making a molded pipe by hardening the linear, tape or cloth member wound around the mandrel,
   (c) disengaging the mandrel from the hardened molded pipe,
   (d) cutting the hardened molded pipe into slices, said cutting occurring in a direction transverse to a longitudinal axis of the mandrel,
   (e) separating the slices into at least two U-shaped portions, and
   (f) forming screw portions at tip portions of a pair of separated U-shaped portions.

2. The manufacturing method of claim 1, wherein the fiber reinforced plastics include thermosetting resin.

3. The manufacturing method of claim 1, wherein the fiber reinforced plastics are composed of a core comprising long fibers extending in an axial direction, and at least one coating layer comprising long fibers oriented in three-dimensional directions and arranged around the core.

4. The manufacturing method of claim 3, wherein the fiber reinforced plastics are made by adhering short fibers oriented in three-dimensional directions with respect to long fibers.

5. A manufacturing method for U-bolts comprising the steps of:
   (a) winding a linear, tape or cloth member made of fiber reinforced plastics in which at least a part of the fiber is oriented in three-dimensional directions around a mandrel having a substantially oval or rectangular section,
   (b) making a molded pipe by hardening the linear, tape or cloth member wound around the mandrel,
   (c) cutting the hardened molded pipe into slices in a direction transverse to a longitudinal axis of the mandrel with the mandrel engaged to the molded article,
   (d) separating the slices from the mandrel and further separating the slices into at least two U-shaped portions, and
   (e) forming screw portions at tip portions of a pair of separated U-shaped portions.

* * * * *